United States Patent
Jones

(10) Patent No.: US 11,361,305 B2
(45) Date of Patent: Jun. 14, 2022

(54) SYSTEMS AND METHODS FOR MULTIPLE ACCOUNT PROPORTIONAL TRANSACTIONS

(71) Applicant: Mastercard International Incorporated, Purchase, NY (US)

(72) Inventor: David Jones, Lenexa, KS (US)

(73) Assignee: Mastercard International Incorporated, Purchase, NY (US)

( * ) Notice: Subject to any disclaimer, the term of this patent is extended or adjusted under 35 U.S.C. 154(b) by 10 days.

(21) Appl. No.: 16/744,294

(22) Filed: Jan. 16, 2020

(65) Prior Publication Data

US 2021/0224789 A1    Jul. 22, 2021

(51) Int. Cl.
| G06Q 20/36 | (2012.01) |
| G06Q 20/40 | (2012.01) |
| G06Q 20/22 | (2012.01) |
| G06Q 20/20 | (2012.01) |

(52) U.S. Cl.
CPC .......... *G06Q 20/36* (2013.01); *G06Q 20/202* (2013.01); *G06Q 20/227* (2013.01); *G06Q 20/409* (2013.01)

(58) Field of Classification Search
None
See application file for complete search history.

(56) References Cited

U.S. PATENT DOCUMENTS

| 7,542,921 | B1* | 6/2009 | Hildreth | G06Q 30/0601 705/26.1 |
| 9,659,304 | B1* | 5/2017 | Toewe | G06Q 20/32 |
| 9,727,859 | B1* | 8/2017 | Toewe | G06Q 20/202 |
| 2003/0233278 | A1* | 12/2003 | Marshall | G06Q 30/0212 705/14.35 |
| 2010/0010906 | A1 | 1/2010 | Grecia | |
| 2012/0158589 | A1 | 6/2012 | Katzin et al. | |
| 2014/0143037 | A1* | 5/2014 | Zhou | G06Q 20/322 705/14.17 |
| 2014/0324690 | A1* | 10/2014 | Allen | G06Q 30/0227 705/41 |
| 2018/0253727 | A1* | 9/2018 | Ortiz | G06Q 20/325 |
| 2019/0392428 | A1* | 12/2019 | Bol | H04L 63/08 |
| 2020/0027315 | A1* | 1/2020 | Cotton | G06Q 20/08 |
| 2021/0065505 | A1* | 3/2021 | Rousseau | G06Q 20/381 |

* cited by examiner

*Primary Examiner* — Fateh M Obaid
(74) *Attorney, Agent, or Firm* — Hovey Williams LLP

(57) ABSTRACT

A system has a datastore including a pro-rata digital wallet associated with a cardholder. The pro-rata digital wallet includes two or more payment card accounts. The system includes a processor programmed to receive an authorization request message from a point-of-sale terminal. The authorization request includes an identification number from a transaction device presented by the cardholder. The processor is programmed to determine whether the identification number corresponds to one of the payment card accounts associated with the pro-rata digital wallet and, if so, identify each of the payment card accounts associated with the pro-rata digital wallet. The processor is programmed to determine a pro-rata payment amount for each of the payment card accounts associated with the pro-rata digital wallet. Each pro-rata payment is based on an available balance of each of the payment card accounts relative to a total available balance for a combination of each of the payment card.

18 Claims, 7 Drawing Sheets

SYSTEMS AND METHODS FOR MULTIPLE ACCOUNT PROPORTIONAL TRANSACTIONS

FIELD OF THE DISCLOSURE

The field of the disclosure relates generally to digital wallets and, more particularly, to systems and methods for splitting a payment transaction across a plurality of payment accounts stored in a digital wallet.

BACKGROUND OF THE DISCLOSURE

Typically, if a consumer wishes to split a transaction across multiple payment card accounts, the cardholder must tell a merchant the amount to place on each of his or her payment cards and physically provide each card to the merchant. Not only is this process inefficient, it can lead to a cardholder increasing a balance on one card in a greater amount than on another card as a cardholder typically does not have the ability to check a card's available balance when performing a transaction. While a cardholder may attempt to keep his or her card balances low or proportionate to one another, this is not an easy task and can lead to inadvertently running the balance on a certain card too high relative to his or her other payment cards.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a digital wallet service server is provided. The server includes a datastore having a transaction processing application, a payment allocation module, and a digital wallet account stored thereon. The digital wallet account is associated with a cardholder and includes a pro-rata digital wallet associated therewith. The pro-rata digital wallet includes two or more payment card accounts associated with the cardholder. The system also includes a processor in communication with the datastore. The processor is programmed to receive, via the transaction processing application, an authorization request message from a point-of-sale (POS) terminal. The authorization request message includes an identification number received by the POS terminal from a transaction device presented by the cardholder. The processor is also programmed to determine whether the identification number corresponds to one of the payment card accounts associated with the pro-rata digital wallet. If the identification number corresponds to one of the payment card accounts, the processor is programmed to identify each of the payment card accounts associated with the pro-rata digital wallet. Furthermore, the processor is programmed to determine, using the payment allocation module, a pro-rata payment amount for each of the payment card accounts associated with the pro-rata digital wallet. Each respective pro-rata payment is based in part on an available balance of each of the payment card accounts relative to a total available balance for a combination of each of the payment card accounts associated with the pro-rata digital wallet.

In another aspect, a method is provided. The method includes receiving, via a transaction processing application, an authorization request message from a point-of-sale (POS) terminal. The authorization request message includes an identification number received by the POS terminal from a transaction device presented by a cardholder. The method also includes determining whether the identification number corresponds to a payment card account associated with a pro-rata digital wallet. The pro-rata digital wallet includes two or more payment card accounts associated with the cardholder. If the identification number corresponds to one of the payment card accounts, the method includes identifying each of the payment card accounts associated with the pro-rata digital wallet. Moreover, the method includes determining, using a payment allocation module, a pro-rata payment amount for each of the payment card accounts associated with the pro-rata digital wallet. Each respective pro-rata payment is based in part on an available balance of each of the payment card accounts relative to a total available balance for a combination of each of the payment card accounts associated with the pro-rata digital wallet.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
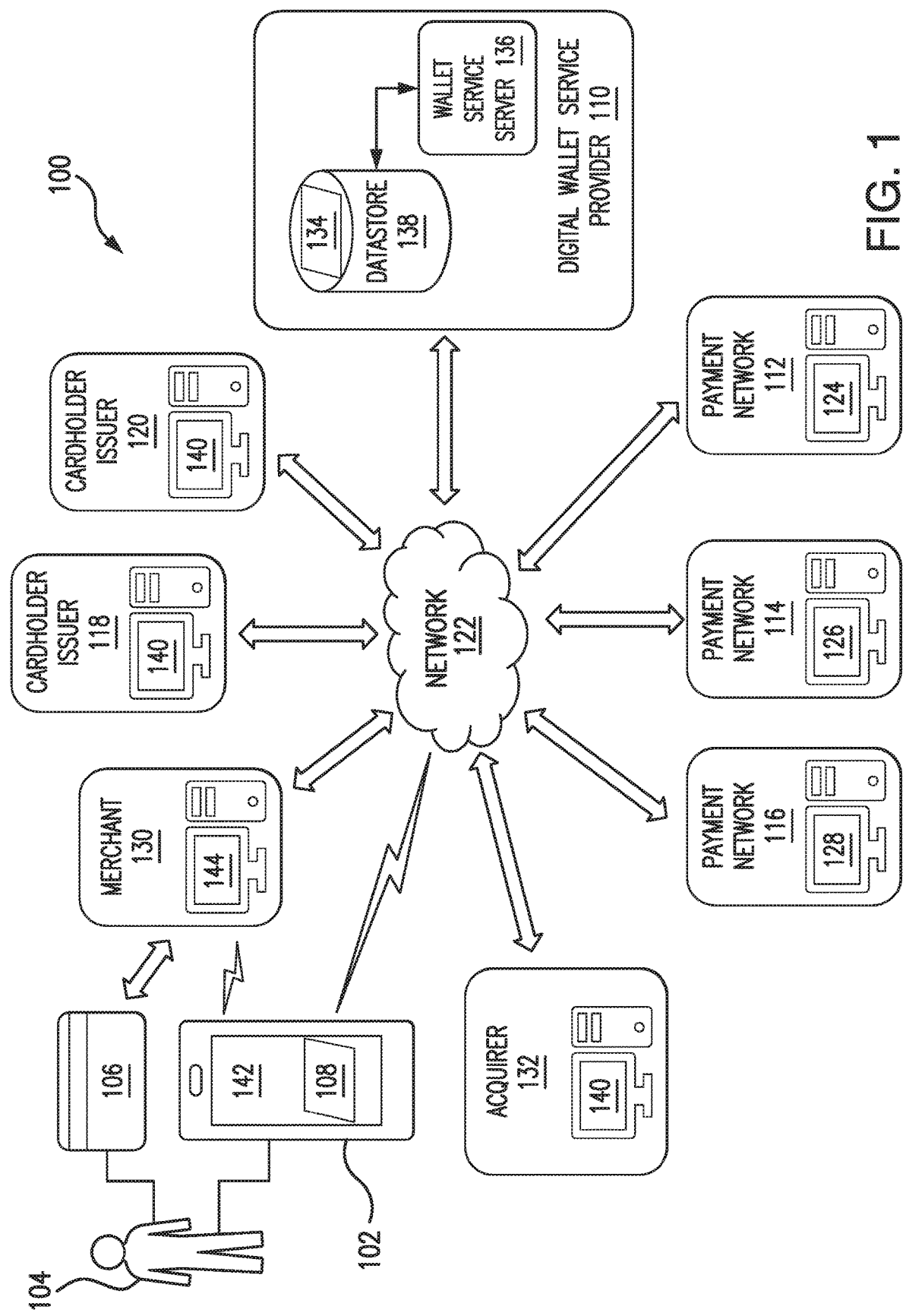
FIG. 1 is a block diagram of an example multi-party network system, including a digital wallet service provider, in accordance with one embodiment of the present disclosure.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. It is contemplated that the invention has general application for splitting a payment transaction across a plurality of payment accounts stored in a digital wallet account of a cardholder. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL. However, any database may be used that enables the systems and methods to operate as described herein.

Embodiments of the present technology relate to systems, methods, and computer-readable media for splitting a payment transaction across a plurality of payment card accounts stored in a pro-rata digital wallet. As such, a cardholder is able to maintain a generally balanced load on his or her payment card accounts rather than running one card up to its limit, etc. According to one embodiment of the disclosure, a computing system is configured to receive a transaction authorization request message associated with one of the cardholders accounts stored in a pro-rata digital wallet. A digital wallet service receives the request message and allocates the transaction amount across each of the cardholder's accounts stored in the pro-rata digital wallet. The allocation can be based on a percent of available credit of each respective card relative to a total amount of available balance of all the accounts.

Payment Network System

FIG. 1 is a block diagram of an example multi-party network system 100, including a cardholder mobile device 102 belonging to a cardholder 104, in accordance with one embodiment of the present disclosure. In the exemplary embodiment, the network system 100 provides interchange network services offered by one or more payment networks, such as payment networks 112, 114, and 116. In addition, the network system 100 enables payment card transactions in which cardholders 104, issuers (e.g., card issuers 118 and 120), merchants 130, and/or acquirers 132 do not need to have a one-to-one relationship. Although parts of the network system 100 are presented in one arrangement, other embodiments may include the same or different parts arranged otherwise, depending, for example, on authorization processes for purchase transactions, communication between computing devices, etc. As used herein, the term "interchange network" includes an electronic network that exchanges data relating to the value of card sales and credits among the card issuers 118, 120 and the acquirers 132 (e.g., networks maintained, for example, by Mastercard®). (Mastercard is a registered trademark of Mastercard International Incorporated.)

In the example embodiment, the network system 100 generally includes the cardholder mobile device 102, a wallet service provider 110, the payment networks 112, 114, and 116, the issuers 118 and 120, the merchant 130, and the acquirers 132 coupled in communication via a communications network 122. The network 122 includes, for example and without limitation, one or more of a local area network (LAN), a wide area network (WAN) (e.g., the Internet, etc.), a mobile network, a virtual network, and/or any other suitable public and/or private network capable of facilitating communication among the cardholder mobile device 102, the wallet service provider 110, the payment networks 112, 114, and 116, the issuers 118 and 120, the merchants 130, and/or the acquirers 132. In some embodiments, the network 122 includes more than one type of network, such as a private payment transaction network provided by the payment networks 112, 114, and 116 to the issuers 118 and 120, the merchant 130, and/or the acquirers 132 and, separately, the public Internet, which may facilitate communication between the cardholder mobile device 102, the wallet service provider 110, the payment networks 112, 114, and 116, the merchants 130, and/or the acquirers 132.

Embodiments described herein relate to transaction card systems, such as a credit card payment system using the Mastercard interchange network. The Mastercard interchange network is a set of proprietary communications standards promulgated by Mastercard for the exchange of financial transaction data and the settlement of funds between financial institutions that are members of Mastercard. As used herein, financial transaction data includes a unique account number associated with an account holder using a payment card, such as a payment card 106, issued by a card issuer (e.g., the card issuer 118 or 120), and/or a digital wallet application (app), such as the digital wallet app 108. In addition, the financial transaction data includes purchase data representing a purchase made by the cardholder 104, including a type of merchant, amount of purchase, date of purchase, and other data, which may be transmitted between any parties of multi-party network system 100.

With continued reference to FIG. 1, in the exemplary embodiment, the cardholder mobile device 102 (e.g., a smartphone or other computing device used by the cardholder 104) includes a user interface 142 that facilitates user interaction with the respective cardholder mobile device 102. For example, and without limitation, the user interface 142 enables the cardholder 104 to input information to the cardholder mobile device 102 and the cardholder mobile device 102 to output information to the cardholder 104 (e.g., on a display of the cardholder mobile device 102). The user interface 142 enables interaction with, for example, the digital wallet app 108, which is installed on the cardholder mobile device 102. In the exemplary embodiment, the digital wallet app 108 is associated with the wallet service provider 110.

In the system 100 described herein, a financial institution called the "card issuer" issues a payment card, such as a payment card 106, to the consumer or cardholder 104. The payment card 106 includes, for example, a conventional payment card, an integrated circuit (IC) payment card (e.g., an EMV or chip card), a smartcard, and the like. The card identification number (e.g., a primary account number (PAN), a virtual PAN, a payment token, etc.) stored in the payment card 106 is used in the system 100 in a manner that is different from its treatment in a conventional payment system. For example, as described herein, the card identification number, as stored in the payment card 106, is used to access a digital wallet account 134 maintained by the wallet service provider 110 for the cardholder 104. The cardholder 104 should be understood to be the authorized person who carries and presents the payment card 106 and who has enrolled and established the digital wallet account 134 with the wallet service provider 110.

The cardholder 104 uses the payment card 106 and/or the digital wallet app 108 to tender payment for a purchase from the merchant 130. In the example embodiment, the merchant 130 is typically associated with products, for example, and without limitation, goods and/or services, that are offered for sale and are sold to the cardholder 104. The merchant 130 includes, for example, a physical location and/or a virtual location. A physical location includes, for example, a brick-and-mortar store, etc., and a virtual location includes, for example, an Internet-based store-front.

With respect to the digital wallet app 108, in the exemplary embodiment, the cardholder mobile device 102 communicates with the wallet service provider 110, for example, via the network 122, to synchronize financial data with the digital wallet account 134 stored by or otherwise accessible to the digital wallet app 108. The wallet service provider 110 also accesses the network 122 to communicate with the issuers 118 and 120 and acquirers 132, via one or more of the payment networks 112, 114, and 116, to facilitate the exchange of funds and other financial data between the acquirers 132 and the cardholder's accounts at the issuers 118 and 120. In addition, the wallet service provider 110 communicates with the issuers 118 and 120 to exchange and/or synchronize financial data with the digital wallet account 134.

The cardholder mobile device 102 can be any computing device capable of interconnecting to the network 122, such as the Internet, including a mobile web-based device, smartphone, PDA, or other mobile web-based connectable equipment. More preferably, the cardholder mobile device 102 is interconnected to the Internet through one or more interfaces including a network, such as a local area network (LAN) or a wide area network (WAN), dial-in-connections, cable modems, wireless modems, and special high-speed ISDN lines.

The wallet service provider 110 includes, for example, and without limitation, a computer, a server, a network of multiple computing devices, a virtual computing device, or the like. In addition, in the exemplary embodiment, the network system 100 also includes one or more payment network server systems 124, 126, and 128 (also referred to as payment systems), which are part of the payment networks 112, 114, and 116, respectively, and are coupled in communication to the network 122. The payment systems 124, 126, and 128 are computers including, for example, a web application, an application programming interface (API) server, and a memory device, enabling the payment systems 124, 126, and 128 to be in communication with the wallet service provider 110 using, for example, and without limitation, the Internet. The payment systems 124, 126, and 128 are interconnected to the Internet through one or more interfaces including a network, such as a local area network (LAN) or a wide area network (WAN), dial-in-connections, cable modems, and special high-speed ISDN lines. The payment systems 124, 126, and 128 can be any computing device capable of interconnecting to the Internet. In certain embodiments of the present invention, the wallet service provider 110 is integrated with or is otherwise a part of one of the payment network server systems 124, 126, and 128. In such an embodiment, the wallet service provider 110 can communicate directly with the payment network server system that it is a part of and communicate with the other payment network server systems via the communication network 122.

The wallet service provider 110 includes, for example, a digital wallet service server 136, which is connected to a datastore 138. In one embodiment, the datastore 138 is stored on the wallet service provider 110 and can be accessed by the cardholder 104 by logging onto the wallet service provider 110, using, for example, the digital wallet app 108. In an alternative embodiment, the datastore 138 may be stored remotely from the wallet service provider 110 and may be non-centralized. The datastore 138 is configured to receive and store cardholder accounts (e.g. the digital wallet account 134) and rules associated with those accounts for dividing transactions proportionately among the cardholder's financial accounts enrolled in the digital wallet account.

In the exemplary embodiment, to accept payment with the payment card 106 or the digital wallet app 108, the merchant 130 must normally establish an account with a financial institution that is part of the payment card network system 100. This financial institution is usually called the "merchant bank," the "acquiring bank," or the "acquirer" (e.g., the acquirer 132). When the cardholder 104 provides payment for a purchase with the payment card 106, the merchant 130 requests authorization from the acquirer 132 for the purchase amount. The request may be performed over the telephone but is usually performed using a point-of-sale (POS) terminal, for example, a POS terminal 144, that connects to the payment card 106. The POS terminal 144 reads the cardholder's payment account information, such as the card identification number, expiration date, etc. from a magnetic stripe and/or an integrated circuit chip on the payment card 106 (or a payment token from the digital wallet app 108) and communicates electronically with the transaction processing computers of the acquirer 132. Alternatively, the acquirer 132 may authorize a third party to perform transaction processing on its behalf. In this case, the POS terminal 144 will be configured to communicate with the third party. Such a third party is usually called a "merchant processor," an "acquiring processor," or a "third party processor."

In the exemplary embodiment, computers of the acquirer 132 or merchant processor communicate with one of the interchange networks 112, 114, or 116 to relay authorization requests and responses messages between the merchant 130 (e.g., via the POS terminal 144) and the card issuer 118 or 120. The respective interchange network analyzes the incoming authorization requests to determine whether to send them to the wallet service provider 110 or directly to the card issuer 118 or 120. For example, the card identification number for a given authorization request is extracted or otherwise read from the authorization request. The respective interchange network 112, 114, or 116 that received the authorization request attempts to match the extracted card identification number to a payment card associated with one of the digital wallet accounts 134 held by the wallet service provider 110. The wallet service provider 110 maintains a list of card identification numbers associated with the cardholders 104 who are registered with the service. If there is a match based on the comparison of the extracted card identification number to the list of card identification numbers associated with the wallet service provider 110, the authorization request is routed to the wallet service provider 110 for further processing.

The wallet service provider 110 matches the authorization request (i.e., the card identification number in the request) to a respective digital wallet account 134. Based on rules for splitting the transaction between financial accounts stored in the digital wallet account 134, the wallet service provider 110 generates one or more pro-rata authorization requests and transmits these to the respective interchange networks 112, 114, and/or 116.

In the exemplary embodiment, using the interchange networks 112, 114, and/or 116, computers of the acquirer 132 or merchant processor communicate with computers of the card issuers 118 and 120 to determine whether the cardholder's accounts are in good standing and whether the purchase is covered by the cardholder's available credit lines. Based on these determinations, the requests for authorization will be declined or accepted. If the requests are accepted, an authorization codes are transmitted to the merchant 130.

When a request for authorization is approved by the card issuers 118 or 120, the available credit line of the cardholder's account is decreased. Normally, a charge for a payment card transaction is not posted immediately to the cardholder's account because bankcard associations, such as Mastercard, have promulgated rules that do not allow the merchant 130 to charge, or "capture," a transaction until the purchased goods are shipped or the purchased services are delivered. However, with respect to at least some debit card transactions, a charge may be posted at the time of the transaction. When the merchant 130 ships or delivers the goods or services, the merchant 130 captures the transaction by, for example, appropriate data entry procedures on the POS terminal 144. This may include bundling of approved transactions daily for standard retail purchases. The interchange networks 112, 114, and 116 and/or the card issuers 118 and 120 store the transaction data, such as, and without limitation, the card identification number, a type of merchant, a merchant identifier, a location where the transaction was completed, an amount of purchase, a merchant category code, a date and time of the transaction, products purchased and related descriptions or identifiers, etc., in a transaction database.

After a purchase has been completed, a clearing process occurs to transfer additional transaction data related to the purchase among the parties to the transaction, such as the acquirer 132, the interchange networks 112, 114, and 116, and the card issuers 118 and 120. More specifically, during and/or after the clearing process, additional data, such as a time of purchase, a merchant name, a type of merchant, purchase information, consumer account information, a type of transaction, information regarding the purchased item and/or service, and/or other suitable information, is associated with a transaction and transmitted between the parties to the transaction as transaction data, and may be stored by any of the parties to the transaction.

After a transaction is authorized and cleared, the transaction is settled among the merchant 130, the acquirer 132, and the card issuers 118 and 120. Settlement refers to the transfer of financial data or funds among the merchant 130, the acquirer 132, and the card issuers 118 and 120 related to the transaction. Usually, transactions are captured and accumulated into a "batch," which is settled as a group. More specifically, a transaction is typically settled between the card issuers 118 and 120 and the interchange networks 112, 114, and 116, and then between the interchange networks 112, 114, and 116 and the acquirer 132, and then between the acquirer 132 and the merchant 130. It should be appreciated that more or less information related to transactions, as part of either authorization, clearing, and/or settling, may be included in the transaction data and stored in the transaction database, at the merchant 130, the acquirer 132, the payment networks 112, 114, and 116, and/or the card issuers 118 and 120. Further, transaction data, unrelated to a particular payment account, may be collected by a variety of techniques, and similarly stored in the transaction database.

In some embodiments, the cardholders 104 involved in the transactions described herein are prompted to agree to legal terms associated with their payment accounts, for example, during enrollment in such payment accounts, etc. As such, the cardholder 104 may voluntarily agree to allow the merchant 130, the card issuers 118 and 120, the interchange networks 112, 114, and 116, etc., to utilize data collected relating to processing the transactions, subsequently for one or more of the purposes described herein.

While only certain numbers of the cardholder 104, merchant 130, acquirer 132, interchange networks 112, 114, and 116, and issuers 118 and 120 are shown in FIG. 1 (for ease of reference), it should be appreciated that a variety of other embodiments may include any number of these parties in various combinations.

Exemplary Computer Systems

Figure 2:
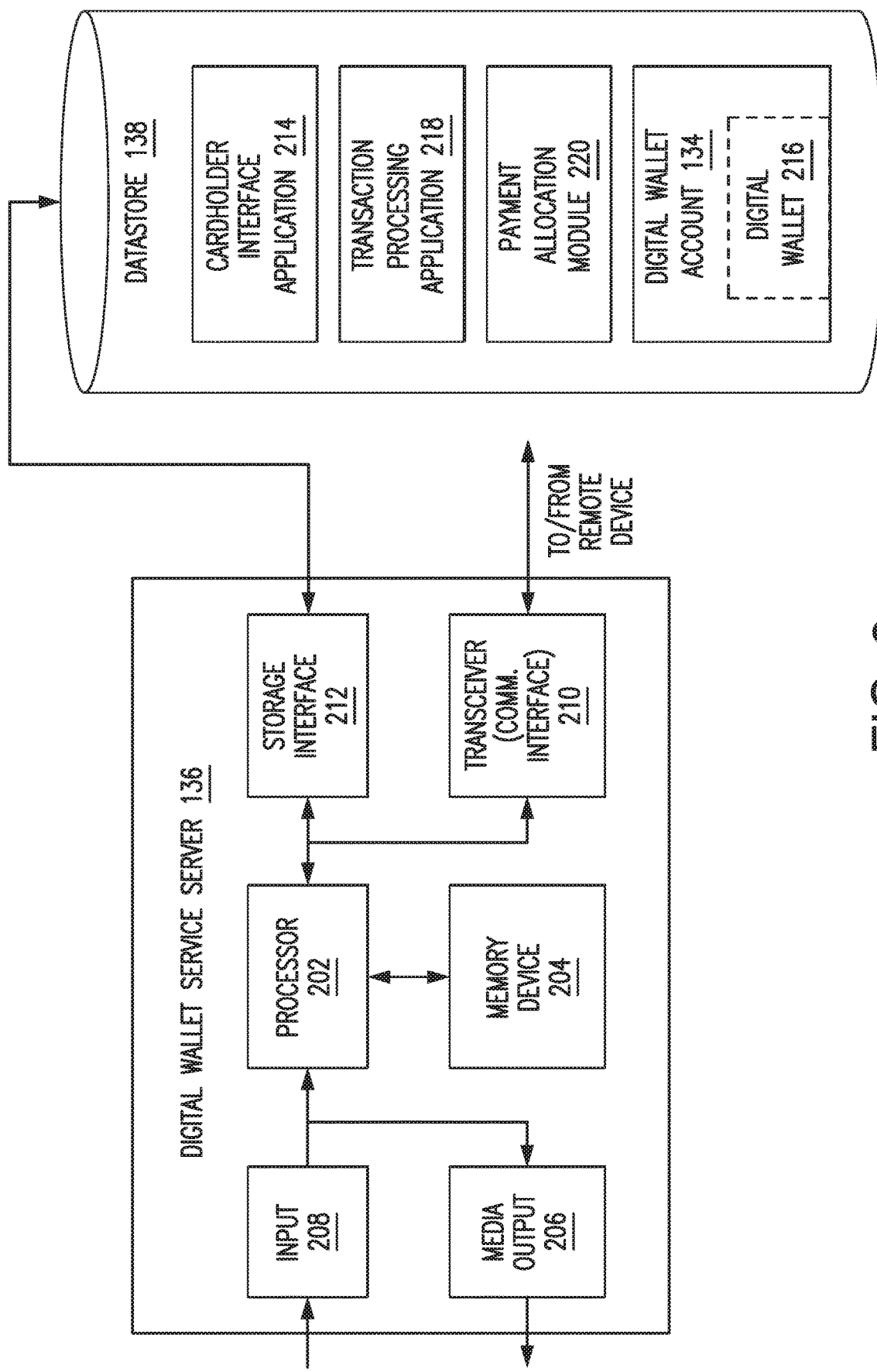
FIG. 2 is an example configuration of a digital wallet service server, which is part of the digital wallet service provider shown in FIG. 1.

FIG. 2 is an example configuration of the digital wallet service server 136, which is part of the wallet service provider 110 (shown in FIG. 1), in accordance with one aspect of the present disclosure. In the exemplary embodiment, the digital wallet service server 136 is a computing device configured to connect to one or more of the cardholder mobile device 102, the card issuers 118 and 120, the payment systems 124, 126, and 128, the merchant 130, the acquirer 132, and any other computing devices, such as other customer mobile computing devices (not shown), via the network 122.

In the example embodiment, the digital wallet service server 136 includes one or more processors 202 for executing instructions. In some embodiments, executable instructions are stored in a memory device 204. The processor 202 may include one or more processing units arranged, for example, in a multi-core configuration. The memory device 204 is any device allowing information such as executable instructions, data, and/or written works to be stored and retrieved. The memory device 204 includes one or more computer readable media. The processor 202 is operable to execute the executable instructions, contained in program instructions, operations, and/or steps described herein, so as to control the digital wallet service server 136 to provide desired functionality.

The digital wallet service server 136 also includes at least one media output component 206 for presenting information to a user (not shown). The media output component 206 is any component capable of conveying information to the user. In some embodiments, the media output component 206 includes an output adapter such as a video adapter and/or an audio adapter. An output adapter is operatively coupled to the processor 202 and operatively connectable to an output device such as a display device, a liquid crystal display (LCD), light emitting diode (LED) display, organic light emitting diode (OLED) display, "electronic ink" display, etc. and/or an audio output device, such as a speaker, or headphones.

In some embodiments, the digital wallet service server 136 includes an input device 208 for receiving input from the user. The input device 208 may include, for example, a touch sensitive panel, a touch pad, a touch screen, a stylus, a photographic element or camera, an optical sensor, a gyroscope, an accelerometer, a position detector, a keyboard, a pointing device, a mouse, or an audio input device. A single component such as a touch screen may function as both an output device of the media output component 206 and the input device 208.

The digital wallet service server 136 also includes a transceiver 210 (broadly, a communication interface), which is communicatively connectable to one or more remote devices such as the cardholder mobile device 102, the card issuers 118 and 120, the payment systems 124, 126, and 128, the merchant 130, the acquirer 132, (each shown in FIG. 1), and any other computing devices via, for example, the network 122 (shown in FIG. 1). The transceiver 210 may include, for example, a wired or wireless network adapter or a wireless data transceiver for use with radio frequency communication, near field communication (NFC), and/or with a mobile phone network, Global System for Mobile communications (GSM), 3G, or other mobile data network, and/or Worldwide Interoperability for Microwave Access (WiMax) and the like. The transceiver 210 may include numerous communication ports (not shown) to enable the digital wallet service server 136 to communicate simultaneously with a number of other computers and other devices, including communications as required to simultaneously handle numerous transactions.

Stored in the memory device 204 are, for example, computer readable instructions for providing a user interface to a user, such as the cardholder 104 (shown in FIG. 1) via the media output component 206 and, optionally, receiving and processing input from the input device 208. A user interface may include, among other possibilities, a web browser and various software applications. Web browsers enable users to display and interact with media and other information typically embedded on a web page or a website. The various software applications allow the user to interact with the digital wallet service server 136 to further communicate with the cardholder mobile device 102, the payment systems 124, 126, and/or 128, etc. to facilitate providing various financial services to the cardholder 104 and, optionally, to substantially simultaneously execute one or more transactions on behalf of the cardholder 104 upon delivery of such services.

In some embodiments, the processor 202 is operatively coupled to the datastore 138 via a storage interface 212. The storage interface 212 is any component capable of providing the processor 202 with access to the datastore 138. The storage interface 212 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 202 with access to the datastore 138.

The datastore 138 is any computer-operated hardware suitable for storing and/or retrieving data. In some embodiments, the datastore 138 is integrated in the digital wallet service server 136. In other embodiments, the datastore 138 is external to the digital wallet service server 136. For example, the digital wallet service server 136 may include one or more hard disk drives as the datastore 138. In other embodiments, the datastore 138 is external to the digital wallet service server 136 and may be accessed by a plurality of database servers. For example, the datastore 138 may include multiple storage units such as hard disks or solid-state disks in a redundant array of inexpensive disks (RAID) configuration. The datastore 138 may include a storage area network (SAN) and/or a network attached storage (NAS) system.

In some embodiments, the processor 202 is operatively coupled to the datastore 138 via a storage interface 212. The storage interface 212 is any component capable of providing the processor 202 with access to the datastore 138. The storage interface 212 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 202 with access to the datastore 138.

The memory device 204 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

In some embodiments, it is contemplated that the digital wallet service server 136 is implemented as a software application. In such embodiments, the hardware described above, such as the processor 202, the memory device 204, and/or the storage interface 212 may be shared with the hardware components of another database server, such as the processor 402, the memory device 404, and/or the storage interface 408 of the server system 400 (shown in FIG. 4).

In the exemplary embodiment, the datastore 138 stores one or more programs for controlling the processor 202. The programs include program instructions, operation, and/or steps (which may be referred to as computer-readable instructions) that contain executable operations of the digital wallet service server 136. When the processor 202 executes the computer-readable instructions, it causes the digital wallet service server 136 to function as described herein.

The programs include, for example, one or more conventional operating systems (not shown) that control the processor 202 so as to manage and coordinate activities and sharing of resources in the wallet digital wallet service server 136, and to serve as a host for application programs that run on the digital wallet service server 136. The one or more conventional operating systems include, for example, and without limitation, UNIX, LINUX, Microsoft Windows®, macOS®, OS X®, etc. More specifically, the computer-readable instructions may cause various data manipulations on data stored in the datastore 138 (e.g., create, read, update, and delete procedures). It should also be appreciated that upon initiation of a computer-based method, various computer-readable instructions may be executed during initialization. Some operations may be required to perform one or more processes described herein, while other operations may be more general and/or specific to a programming language (e.g., C, C#, C++, Java, or other suitable programming languages, etc.).

The programs stored in the datastore 138 include, for example, a cardholder registration application 214 that, when executed by the processor 202, enables the digital wallet service server 136 to handle requests from cardholders, such as the cardholder 104 (shown in FIG. 1), to register for digital wallet services provided by the digital wallet service server 136. Using the cardholder registration application 214, the cardholder 104 creates his or her digital wallet account 134. The digital wallet account 134 operates to allow the cardholder 104 to input his or her payment card account details to generate one or more digital wallets, such as pro-rata digital wallet 216, maintained by the digital wallet service server 136.

In addition, the datastore 138 includes a transaction processing application 218 for handling electronic transaction messages used to execute payment transactions on behalf of the cardholder 104. The transaction processing application 218 receives authorization requests from the merchant 130, via the acquirer 132 for example, that are associated with the cardholder 104. As described in detail below, the transaction processing application 218 reads the payment card account details from the cardholder's pro-rata digital wallet 216 and, using a payment allocation module 220, generates two or more pro-rata authorization requests that are then routed to the appropriate payment systems 124, 126, and/or 128.

In the exemplary embodiment, cardholders (e.g., the cardholder 104) who have two or more payment cards and/or accounts (whether from one issuer or from varying issuers) register or enroll with the wallet service provider 110 to create his or her digital wallet(s) (e.g., the pro-rata digital wallet 216), which is then maintained by the wallet service provider 110. The cardholder 104 may register for the service by interacting with a webpage that is hosted by the digital wallet service server 136. After the cardholder 104 has established his or her digital wallet account 134 via the webpage, he or she may request the digital wallet service server 136 to establish the pro-rata digital wallet 216. It is noted that the cardholder may have more than one (1) digital wallet maintained by the wallet service provider 110. The pro-rata digital wallet 216, however, contains the cardholder's payment cards involved with the payment allocation module 220, as described further herein. The cardholder 104 adds two or more of his or her payment cards and/or accounts to his or her digital wallet account 134 for use in the pro-rata digital wallet 216. For example, and without limitation, in one suitable embodiment, the cardholder 104 authorizes the digital wallet service server 136 to contact the card issuers (e.g., the card issuers 118 and 120) of the payment card accounts to initiate a process of inputting the relevant payment account data (e.g., cardholder information, payment tokens, etc.) into the pro-rata digital wallet 216. Alternatively, the cardholder may individually send requests to the card issuers 118 and 120 to transfer the payment account data to the cardholder's digital wallet app 108. The digital wallet app 108 is configured to communicate with the digital wallet service server 136 and synchronize payment account data between the digital wallet app 108 and the pro-rata digital wallet 216.

In certain other embodiments, in addition to payment cards and/or accounts (e.g., credit card accounts and debit card accounts), the cardholder 104 may include other types of accounts as well, such as gift card accounts, loyalty rewards accounts, benefit disbursement accounts, transit access accounts, etc. The accounts may be associated with any payment network, such as one of the payment networks 112, 114, or 116.

In certain embodiments, the cardholder's pro-rata digital wallet 216 is allocated a digital wallet identification number, which may be in substantially the same format as a card identification number (e.g., PAN, virtual PAN, payment token, etc.). The digital wallet identification number is transmitted to the digital wallet app 108 stored on the cardholder mobile device 102. As such, when the cardholder 104 elects to perform a transaction with the digital wallet app 108, the digital wallet identification number is transmitted to the merchant 130 via the POS terminal 144. This facilitates routing the authorization request directly to the wallet service provider 110.

Figure 3:
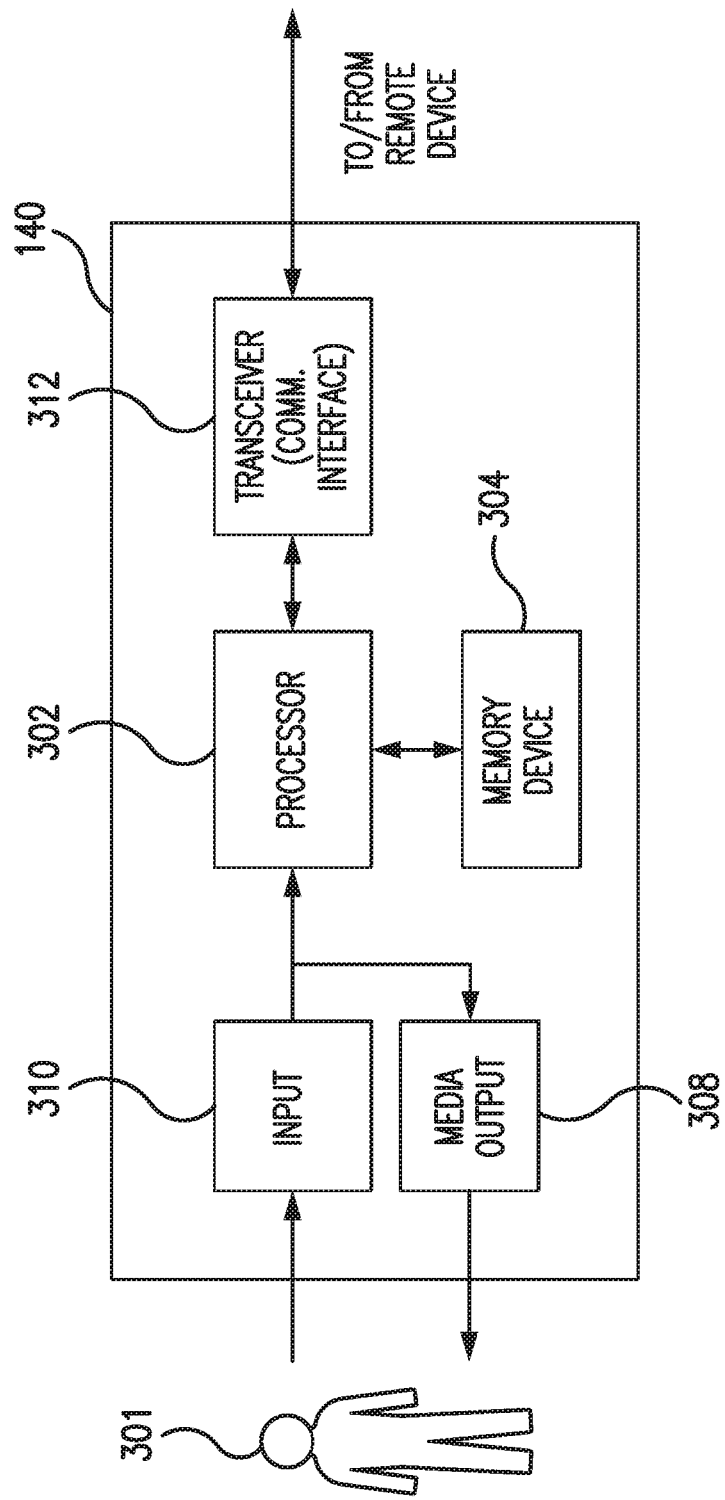
FIG. 3 is an example configuration of a client system for use in the network system shown in FIG. 1.

FIG. 3 is an example configuration of a client system 140 operated by a user 301. In some embodiments, the client system 140 is a cardholder mobile device 102, a merchant's computing device, and/or an acquirer's computing device (all shown in FIG. 1).

In the example embodiment, the client system 140 includes one or more processors 302 for executing instructions. In some embodiments, executable instructions are stored in a memory device 304. The processor 302 may include one or more processing units arranged, for example, in a multi-core configuration. The memory device 304 is any device allowing information such as executable instructions, data, and/or written works to be stored and retrieved. The memory device 304 includes one or more computer readable media.

The client system 140 also includes at least one media output component 308 for presenting information to the user 301. The media output component 308 is any component capable of conveying information to the user 301. In some embodiments, the media output component 308 includes an output adapter such as a video adapter and/or an audio adapter. An output adapter is operatively coupled to the processor 302 and operatively connectable to an output device such as a display device, a liquid crystal display (LCD), organic light emitting diode (OLED) display, or "electronic ink" display, or an audio output device, a speaker, or headphones.

In some embodiments, the client system 140 includes an input device 310 for receiving input from the user 301. The input device 310 may include, for example, a touch sensitive panel, a touch pad, a touch screen, a stylus, a photographic element or camera, an optical sensor, a gyroscope, an accelerometer, a position detector, a keyboard, a pointing device, a mouse, or an audio input device. A single component such as a touch screen may function as both an output device of the media output component 308 and the input device 310. The client system 140 may also include a transceiver 312 (broadly, a communication interface), which is communicatively connectable to a remote device such as the digital wallet service server 136 (shown in FIG. 1). The transceiver 312 may include, for example, a wired or wireless network adapter or a wireless data transceiver for use with radio frequency communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 304 are, for example, computer readable instructions for providing a user interface, such as the user interface 142 (shown in FIG. 1), to the user via the media output component 308 and, optionally, receiving and processing input from the input device 310. The user interface 142 may include, among other possibilities, a web browser and various software applications. Web browsers enable users to display and interact with media and other information typically embedded on a web page or a website. The various software applications allow the user 301 to interact with the client system 140 to further communicate with the digital wallet service server 136, other cardholder mobile devices, other client systems, payment systems (e.g., the payment systems 124, 126, and/or 128), etc. to facilitate providing various financial services to the cardholder 104 and, optionally, execute a transaction upon delivery of such services.

Figure 4:
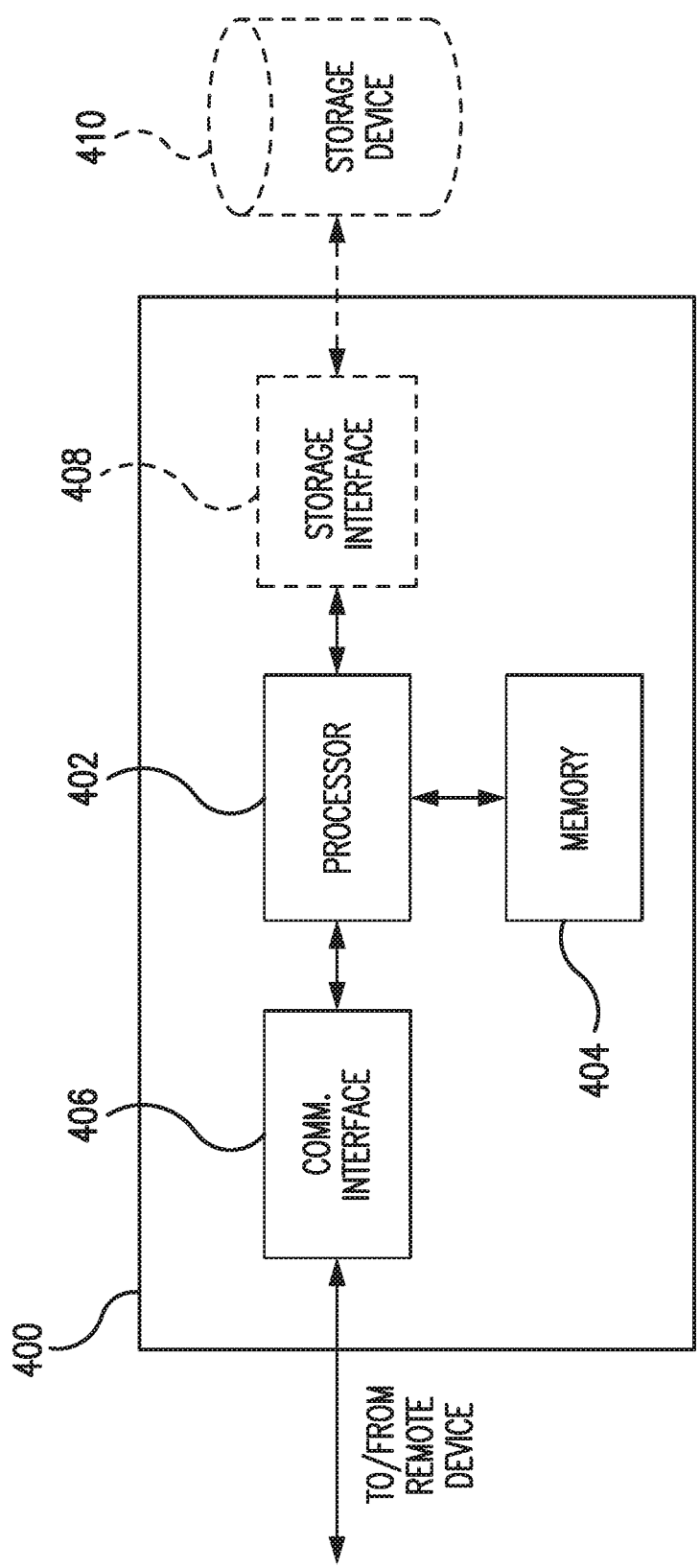
FIG. 4 is an example configuration of a server system for use in the network system shown in FIG. 1.

FIG. 4 is an example configuration of a server system 400, such as the payment systems 124, 126, and/or 128 (shown in FIG. 1). In the example embodiment, the server system 400 includes a processor 402 for executing instructions. The instructions may be stored in a memory area 404, for example. The processor 402 includes one or more processing units (e.g., in a multi-core configuration) for executing the instructions. The instructions may be executed within a variety of different operating systems on the server system 400, such as UNIX, LINUX, Microsoft Windows®, etc. More specifically, the instructions may cause various data manipulations on data stored in a storage device 410 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

The processor 402 is operatively coupled to a communication interface 406 such that the server system 400 can communicate with a remote device such as cardholder mobile device 102, the digital wallet service server 136, a client system 140, or another server system. For example, the communication interface 406 may receive communications from the acquirer client system 140 and the digital wallet service server 136.

The processor 402 is operatively coupled to the storage device 410. The storage device 410 is any computer-operated hardware suitable for storing and/or retrieving data. In some embodiments, the storage device 410 is integrated in the server system 400. In other embodiments, the storage device 410 is external to the server system 400 and is like a transaction database. For example, the server system 400 may include one or more hard disk drives as the storage device 410. In other embodiments, the storage device 410 is external to the server system 400 and may be accessed by a plurality of server systems 400. For example, the storage device 410 may include multiple storage units such as hard disks or solid-state disks in a redundant array of inexpensive disks (RAID) configuration. The storage device 410 may include a storage area network (SAN) and/or a network attached storage (NAS) system.

In some embodiments, the processor 402 is operatively coupled to the storage device 410 via a storage interface 408. The storage interface 408 is any component capable of providing the processor 402 with access to the storage device 410. The storage interface 408 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 402 with access to the storage device 410.

The memory area 404 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

In some embodiments, it is contemplated that the server system 400 is implemented as a software application. In such embodiments, the hardware described above, such as the processor 402, the memory area 404, the communication interface 406, and/or the storage interface 408 may be shared with the hardware components of a client system 140, such as the processor 302, the memory device 304, and/or the transceiver 312.

Exemplary Computer-Implemented Methods

Figure 5:
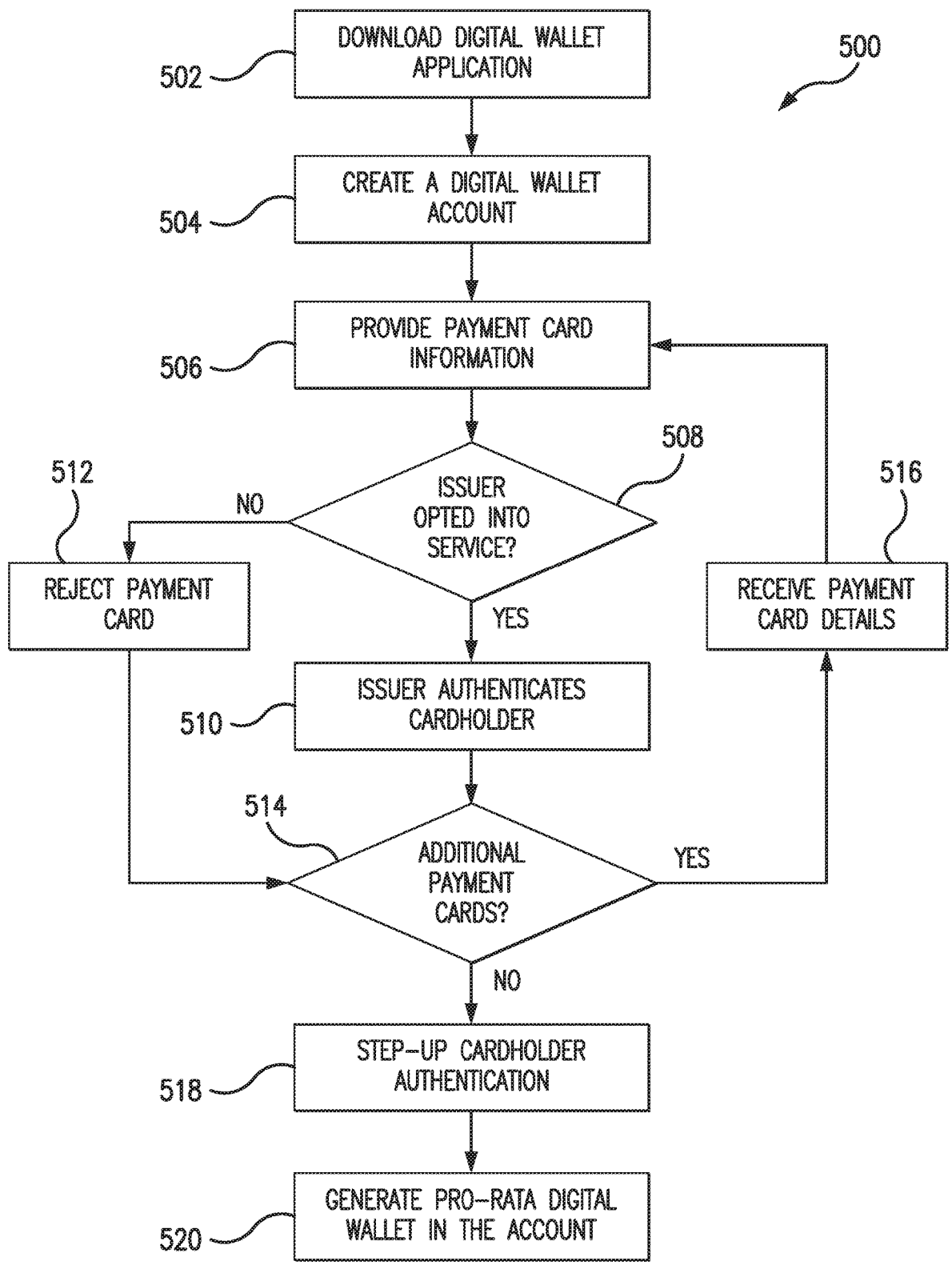
FIG. 5 is a flowchart illustrating an exemplary computer-implemented method for registering a cardholder with the digital wallet service provider shown in FIG. 1, in accordance with one embodiment of the present disclosure.

FIG. 5 is a flowchart illustrating an exemplary computer-implemented method 500 for registering a cardholder with a digital wallet service provider, in accordance with one embodiment of the present disclosure. The operations described herein may be performed in the order shown in FIG. 5 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 500 is described below, for ease of reference, as being executed by exemplary devices and components introduced with the embodiments illustrated in FIGS. 1-4. In one embodiment, the computer-implemented method 500 is implemented by the digital wallet service server 136 (shown in FIG. 2). In the exemplary embodiment, the computer-implemented method 500 relates to registering a cardholder for a service configured to split a payment transaction in a pro-rate manner across two (2) or more payment cards and/or accounts of the cardholder. While operations within the computer-implemented method 500 are described below regarding the digital wallet service server 136, according to some aspects of the present invention, the computer-implemented method 500 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

At operation 502, in the example embodiment, the cardholder 104 downloads the digital wallet app 108 (shown in FIG. 1). For example, the cardholder 104 may connect to the digital wallet service provider 110, which may instruct the cardholder 104 to download the digital wallet app 108 to the cardholder mobile device 102. The digital wallet app 108 is configured for communication with the digital wallet service server 136 via the one or more of the interchange networks 112, 114, and/or 118 for example, without use of a web browser. When the cardholder 104 uses the digital wallet app 108, a direct link is established via a wireless connection, for example, via a Wi-Fi connection to the network 122.

In the example embodiment, the cardholder 104 downloads the digital wallet app 108. The cardholder mobile device 102, such as a web-based smartphone, is configured to execute for display the digital wallet app 108. In some embodiments, the digital wallet app 108 may be stored in a cloud-based interface, which may include cloud storage capability as well as any cloud-based API that facilitates communication between the cardholder mobile device 102 and digital wallet service server 136. The digital wallet app 108 facilitates transmitting and receiving data between the cardholder mobile device 102 and digital wallet service server 136 for enrolling the cardholder in the digital wallet service and adding/modifying/deleting the cardholder's credit cards and/or accounts.

At operation 504, the cardholder 104 is presented an option to create a digital wallet account, such as the digital wallet account 134 (shown in FIG. 2). For example, the cardholder 104 enrolls for the digital wallet service via the digital wallet app 108 or via a suitable webpage of the digital wallet service server 136 using, for example, a cardholder computer system (not shown) or a client system 140. It should be understood that the cardholder 104 may enroll or register with the digital wallet service in any of several ways, including utilizing a cardholder computer system to access the digital wallet service server 136 via the Internet and providing the required information. During cardholder enrollment, the cardholder 104 may provide enrollment data including basic information about himself or herself (e.g., name, address, phone number, etc.) and, in some embodiments, provide information regarding the cardholder's mobile devices (for example, by providing a IMEI number, a SIM identifier, a mobile telephone number, and/or other unique device identifier). In addition, the cardholder 104 may provide information and/or preferences concerning one or more family members, such as a spouse and/or children to form a "Household" digital wallet account 134. It is noted that the digital wallet account 134 can be linked to other Mastercard services if the cardholder 104 is already signed up for other unrelated services. In some embodiments, the information obtained from the cardholder 104 during the enrollment process includes product and/or service preferences, and/or other information.

At operation 506, the cardholder 104 may also provide information concerning his or her payment card 106 (shown in FIG. 1), such as a bank credit card account, debit card account, loyalty card account, and/or gift card issued to or held by him or her. At operation 508, the digital wallet service server 136 determines whether the card issuers 118 and/or 120 of the payment card 106 has opted-in to the digital wallet service. If the card issuers 118 and/or 120 chooses to opt-in to the digital wallet service, at operation 510 the issuers 118 and/or 120 authenticates the cardholder 104 in real-time. For example, and without limitation, the issuers 118 and/or 120 may authenticate the cardholder 104 via a one-time code sent to the cardholder 104 via Short Message Service (SMS), e-mail, through an issuer mobile application, through a call center communication, and the like. In the exemplary embodiment, issuer authentication is the preferred method for authenticating the cardholder 104, as the issuers 118 and/or 120 and the cardholder 104 have a direct, one-to-one relationship. If the issuers 118 and/or 120 are not opted-in to the digital wallet service and therefore, do not participate in the enrollment process, at operation 512, the digital wallet service server 136 rejects the cardholder's payment card.

At operation 514, the digital wallet service server 136 asks the cardholder 104 whether the cardholder has additional payment cards he or she wishes to associate with the cardholder's digital wallet account 134. If the cardholder has additional payment cards to enter, at operation 516, the digital wallet service server 136 receives the payment card details from the cardholder 104 and returns to operation 506. If the cardholder does not have any additional payment cards to enter, the method continues to operation 518.

At operation 518, the digital wallet service server 136 requests that the cardholder 104 set up a step-up authentication method, i.e., two-factor authentication. The additional authentication measures may be taken before the transactions may be entered into the digital wallet service by the cardholder 104. For example, and without limitation, in one embodiment, the cardholder 104 is requested to establish account access credentials, e.g., to select a username and password or PIN (personal identification number) to be used for security purposes, and/or for use by the cardholder 104 to login and change one or more preferences and/or requirement settings, for example. In addition to the password or PIN, the cardholder is requested to set up a second authentication factor, including, for example, and without limitation, providing a biometric sample that is to be associated with the other registration information provided.

Biometric samples include, without limitation, a fingerprint image, a voice recording, a retinal image, facial recognition, palm print image, iris recognition, and the like. The biometric sample is unique to the cardholder 104 and difficult to duplicate and/or forge by an unauthorized user. The biometric sample is stored and associated with a biometric identifier, for example, by the digital wallet service server 136 (e.g., in the datastore 138). Additionally, the biometric identifier is associated with the stored registration information and facilitates secure authorization of transactions input by the cardholder 104. A biometric input device in communication with the cardholder mobile device 102 may be used for the cardholder 104 to enter the biometric sample. For example, the cardholder mobile device 102 may include an integral fingerprint or palm reader/scanner, retinal or iris reader/scanner, and/or voice reader/recorder.

In other suitable embodiments, the second factor may include, for example, and without limitation, SMS two-factor authentication (where a one-time use short code in sent to the cardholder's mobile device via SMS), Time-Based One Time Password (TOTP) authentication (where an authenticator application provides a short code as a second factor), push-based two-factor authentication (where a prompt is sent to the cardholder's mobile device), or any other two-factor authentication method that enables the method 600 to operate as described herein.

At operation 520, the digital wallet service server 136 generates a pro-rata digital wallet 216 in the digital wallet account 134 for the cardholder 104, associating the cardholder's two or more payment cards with the pro-rata digital wallet along with the cardholder's account access credentials.

Figure 6A:
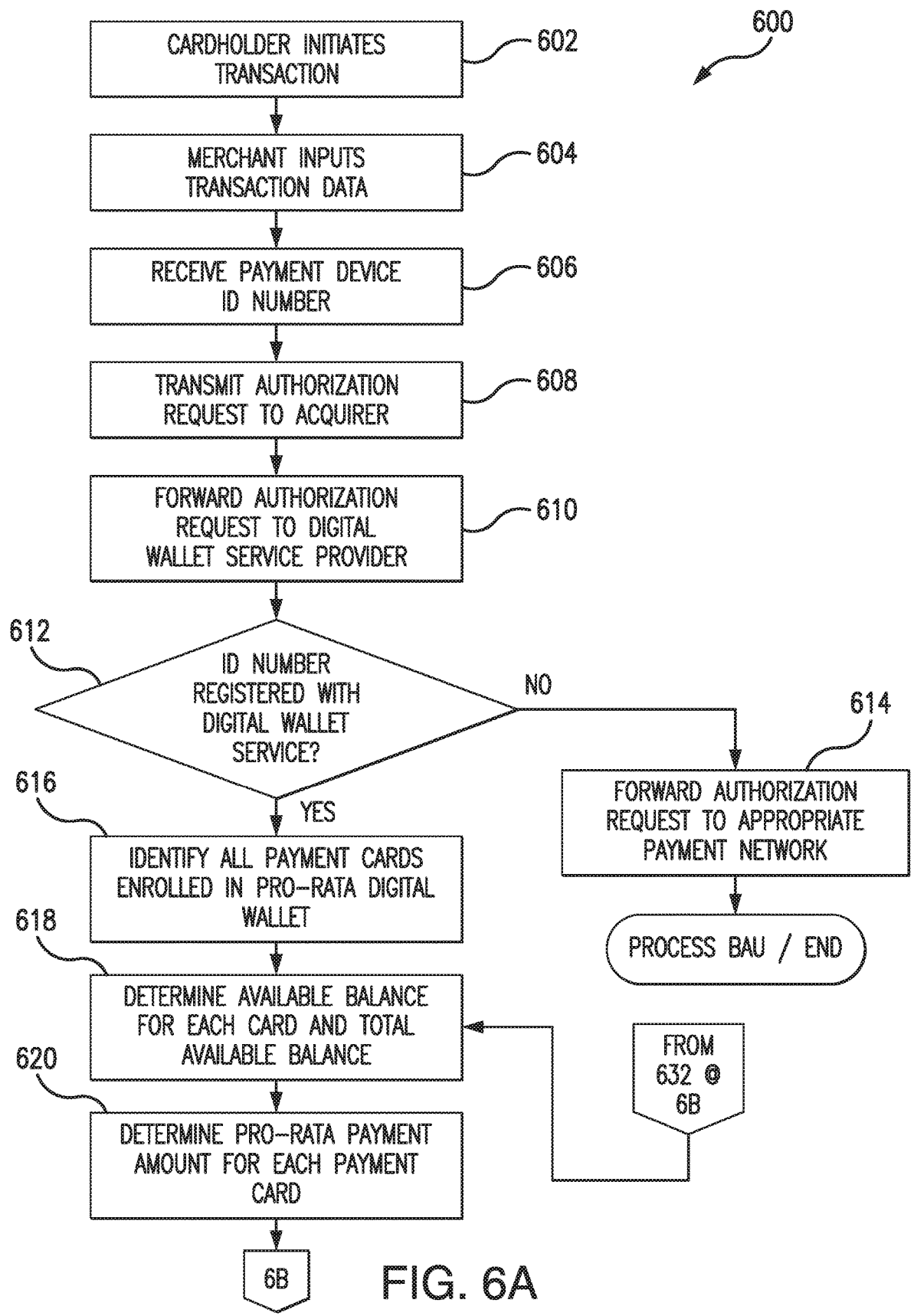
FIGS. 6A and 6B are a flowchart illustrating an exemplary computer-implemented method for automatically splitting a payment transaction in a pro-rata manner across two or more of a cardholder's payment cards or accounts, in accordance with one embodiment of the present disclosure.
Figure 6B:
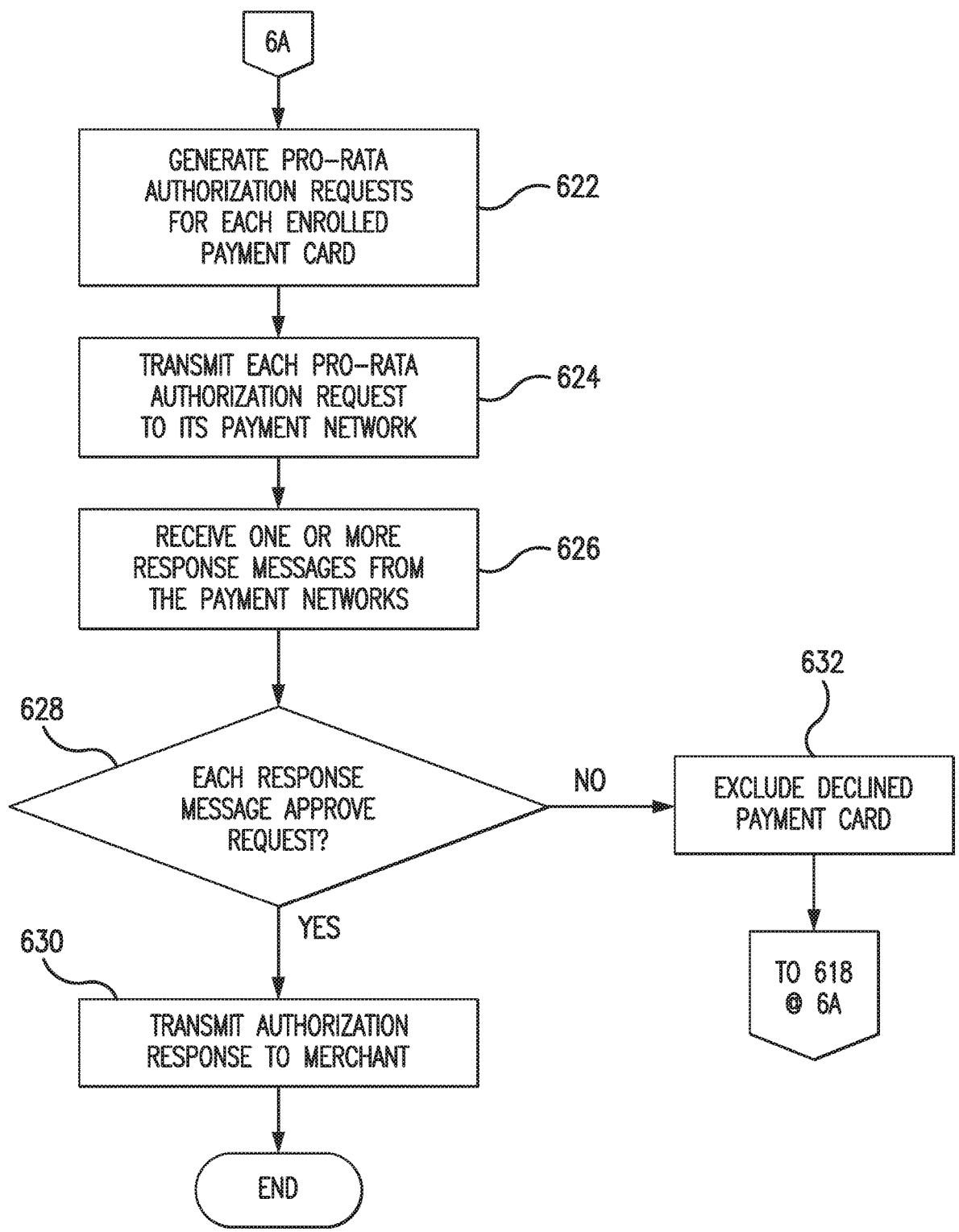

FIGS. 6A and 6B are a flowchart illustrating an exemplary computer-implemented method 600 for automatically splitting a payment transaction in a pro-rata manner across two (2) or more of a cardholder's payment cards or accounts, in accordance with one embodiment of the present disclosure. The operations described herein may be performed in the order shown in FIGS. 6A and 6B or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 600 is described below, for ease of reference, as being executed by exemplary devices and components introduced with the embodiments illustrated in FIGS. 1-4. In one embodiment, the computer-implemented method 600 is implemented by the digital wallet service server 136 (shown in FIG. 2). In the exemplary embodiment, the computer-implemented method 600 relates to a process for automatically splitting a payment transaction in a pro-rate manner across two (2) or more payment cards and/or accounts of the cardholder. While operations within the computer-implemented method 600 are described below regarding the digital wallet service server 136, according to some aspects of the present invention, the computer-implemented method 600 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

At operation 602, in the example embodiment, the cardholder 104 initiates a purchase transaction at a merchant, such as the merchant 130 (shown in FIG. 1). For example, and without limitation, the merchant 130 may include a brick-and-mortar retail store or an online virtual store. The cardholder 104 selects merchandise (e.g., one or more goods and/or services) and presents it to the merchant 130 for purchase at, for example, a point-of-sale (POS) terminal, such as the POS terminal 144.

At operation 604, the merchant 130 inputs transaction data into the POS terminal 144. In one embodiment, the transaction data is received by the POS terminal by a sales associate scanning barcodes on the merchandise to allow input to the POS terminal 144 of the merchandise identifiers. Based on the identifiers, the POS terminal 144 performs a lookup operation to identify price information for the merchandise items. The POS terminal 144 calculates a total amount for the purchase transaction (i.e., the transaction amount).

At operation 606, the POS terminal 144 reads or otherwise receives the card identification number from the payment card 106 and/or the digital wallet identification number from the cardholder mobile device 102 (broadly, transaction devices) via, for example, the input device 310 (shown in FIG. 3), such as a card/chip reader. The POS terminal 144 receives additional information as well from the transaction devices (i.e., the payment card 106 and/or the cardholder mobile device 102), such as an expiration date, service code, CVC values, and the like, to facilitate performing the transaction.

At operation 608, the POS terminal 144 transmits an authorization request message to the acquirer 132. For example, and without limitation, the merchant 130 generates the authorization request message (e.g., a message type indicator (MTI) 0100 message) by extracting the card identification number or digital wallet identification number as a PAN or payment token, and transmitting the MTI 0100 message to the acquirer client system 140 using the PAN or payment token.

At operation 610, the MTI 0100 message is forwarded by the acquirer 132 to the digital wallet service provider 110. At operation 612, the digital wallet service provider 110, and more particularly, the transaction processing application 218 (shown in FIG. 2) determines whether the card identification number or digital wallet identification number correspond to or are enrolled in a digital wallet account, such as the digital wallet account 134. If the card identification number or digital wallet identification number are not enrolled in a respective digital wallet account, at operation 614, the transaction processing application 218 transmits the MTI 0100 message to the appropriate payment network 112, 114, or 116 based on a bank identification number (BIN) contained in the card identification number or digital wallet identification number for processing as a conventional payment transaction.

If the card identification number or digital wallet identification number corresponds to or is enrolled in a respective digital wallet account 134, at operation 616, the transaction processing application 218 identifies all of the cardholder's enrolled payment cards or accounts contained in the respective pro-rata digital wallet 216. The account data associated with the cardholder's enrolled payment cards or accounts is transmitted to the payment allocation module 220.

At operation 618, the payment allocation module 220 determines the available balances for each of the cardholder's enrolled payment cards or accounts and a total available balance of all of the enrolled payments cards or accounts combined. For example, the transaction processing application 218 may request an available balance for each of the cardholder's enrolled payment cards or accounts from its respective card issuer. At operation 620, the payment allocation module 220 determines a pro-rata payment amount for each enrolled payment card or account. The pro-rata payment amount is based on the respective card or account's available balance percentage of the total available balance. In an example, a cardholder 104 has four (4) payment cards (e.g., card A, B, C, and D) enrolled in his or her pro-rata digital wallet 216. Card A has an available balance of one hundred dollars ($100), card B has an available balance of two hundred dollars ($200), card C has an available balance of two hundred dollars ($200), and card D has an available balance of fifteen hundred dollars ($1,500). As such, the total available balance is the sum of the available balances of cards A, B, C, and D.

$$A+B+C+D=x$$

$$\$100+\$200+\$200+\$1{,}500=\$2{,}000$$

The available balance percentage for each of the payment cards is the respective card's available balance divided by the total available balance. Thus:

$$A = \frac{\$100}{\$2{,}000} = 5\%$$

$$B = \frac{\$200}{\$2{,}000} = 10\%$$

$$C = \frac{\$200}{\$2{,}000} = 10\%$$

$$D = \frac{\$1,500}{\$2,000} = 75\%$$

For a transaction having a transaction amount of one hundred dollars ($100), as indicated in the MTI 0100 message, the payment allocation module 220 multiples the percentage value for each respective card or account by the transaction amount. Thus, in the example above, card A is allocated five dollars ($5) of a one hundred dollar ($100) transaction, card B is allocated ten dollars ($10), card C is allocated ten dollars ($10), and card D is allocated seventy-five dollars ($75).

It should be noted that while the example pro-rata payment amount for each enrolled payment card or account is based on an available balance percentage of for each enrolled payment card or account relative to a total available balance, there are a number of ways in which a pro-rata distribution can be determined. For example, in one suitable embodiment, if each of the payment cards or accounts A, B, C, and D have different interest rates associated with carried-over balances, the interest rates can be a factor along with the available balances in determining the pro-rata payment amount for each card.

In one example, card A (from the above example) has a two and a half percent (2.5%) interest rate, cards B and C have six percent (6%) interest rates, and card D has a ten percent (10%) interest rate. A combined mean interest rate for the four (4) cards is calculated by multiplying the interest rate of a respective card by its available balance, totaling the resulting values, and dividing the totaled result by the total available balance. For example:

$$\text{card } A = \$100 \times 2.5\% = \$2.50$$

$$\text{cards } B \text{ and } C = \$200 \times 6\% = \$12$$

$$\text{card } D = \$1,500 \times 10\% = \$150$$

$$\text{sum of calculations} = \$176.50$$

$$\text{combined mean} = \frac{\$176.50}{\$2,000} = 8.825\%$$

For each of the payment cards A, B, C, and D, an adjustment factor can be calculated by the payment allocation module 220 which considers the interest rates of the cards relative to the combined mean. One example formula calculates the percentage difference of a respective card's interest rate relative to the combined mean. The formula is:

$$1 - \frac{\text{card } \%}{\text{combined mean}} = \text{adjustment factor}$$

Thus, the calculations for each of the payment cards A, B, C, and D are as follows:

$$\text{card } A = 1 - \frac{2.5\%}{8.825\%} = 0.7167$$

$$\text{cards } B \text{ and } C = 1 - \frac{6\%}{8.825\%} = 0.3201$$

$$\text{cards } D = 1 - \frac{10\%}{8.825\%} = -0.1331$$

In this example, the adjustment factors indicate a percentage value of the respective card's pro-rata allocation (based only on available balances) to be added or subtracted from the respective card's pro-rata allocation. For example, the pro-rata allocation of five dollars ($5) for payment card A is to be increased by a factor of seven thousand one hundred and sixty-seven ten-thousandths (0.7167) of card A's pro-rata allocation. The calculations for each of the payment cards are shown below.

$$\text{card } A = \$5 + (\$5 \times 0.7167) = \$8.58$$

$$\text{cards } B \text{ and } C = \$10 + (\$10 \times 0.3201) = \$13.20$$

$$\text{card } D = \$75 + (\$75 \times -0.1331) = \$65.02$$

Thus, because cards A-C have interest rates below the combined mean value, these cards see an increase in their pro-rata allocations. Card D, however, has a decreased pro-rata allocation due to it having an interest rate that is above the combined mean.

At operation 622, the transaction processing application 218 generates a pro-rata authorization request message (e.g., an MTI 0100 message) for each respective payment card or account enrolled in the cardholder's digital wallet 216 associated with the digital wallet account 134. For example, in the examples described above, the transaction processing application 218 generates MTI 0100 messages for each of the payment cards A, B, C, D, where the card information (e.g., the PAN) in a respective message is associated with one of the payment cards. The transaction amount includes the pro-rata allocation determined by the payment allocation module 220, as described above.

At operation 624, the transaction processing application 218 transmits each of the pro-rata authorization request messages to their respective payment networks, such as the payment networks 112, 114, and 116, based on a bank identification number (BIN) contained in the PAN for each payment. The payment networks 112, 114, and 116 process the payments as typical, conventional transactions. At operation 626, the transaction processing application 218 receives one or more pro-rata authorization request response messages (e.g., an MTI 0110 message) from the payment networks 112, 114, and 116. For example, the transaction processing application 218 may receive one pro-rata MTI 0110 message for each pro-rata MTI 0100 message that it transmitted.

At operation 628, the transaction processing application 218 determines whether each of the pro-rata MTI 0110 messages approved its respective authorization request. If all of the pro-rata MTI 0110 messages contains an approval or authorization, at operation 630, the transaction processing application 218 transmits an authorization request response message to the merchant 130, via the acquirer 132. The authorization request response message is a response to the authorization request message received by the digital wallet service provider 110 in operation 610 above.

If one or more of the pro-rata MTI 0110 messages declines its respective transaction, at operation 632, the transaction processing application 218 repeats the allocation calculation process, excluding the declined payment card, by returning to operation 618. The process is repeated using only those payment cards or accounts that indicated the respective transaction was approved or authorized. The process may be repeated any number of times as may be determined by an administrator of the digital wallet service provider 110. Alternatively, in some embodiments, the transaction processing application 218 may transmit an authorization request response message declining the transaction if any one or more of the payment cards or accounts declined its pro-rata authorization request. In still other alternative embodiments, the transaction processing application 218 may be programmed to simply pass the original authorization request message to the card issuer (e.g., the card issuers 118 and 120) of the payment card used in the transaction or a default payment card assigned to handle transactions using the digital wallet identification number.

It should be noted that the cardholder 104 can unregister, cancel, temporarily suspend, and/or activate his or her pro-rata digital wallet 216 and/or digital wallet account 134 as his or her discretion. For example, if the cardholder 104 wishes to perform a certain transaction using only a certain card, the cardholder 104 can suspend his or her pro-rata digital wallet 216 and/or digital wallet account 134 using, for example, the digital wallet app 108 and/or a webpage provided by the digital wallet service provider 110. In addition, the cardholder 104 can add, remove, and/or modify the combination of payment cards enrolled in his or her pro-rata digital wallet 216 using the digital wallet app 108. As such, the cardholder 104 may maintain one or more payment cards in his or her digital wallet account 134 but separate from his or her pro-rata digital wallet 216. It is only the payments cards enrolled or associated with the pro-rata digital wallet 216 that are used for pro-rata payments, as described above.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

1. A digital wallet service server comprising:
   a datastore comprising a transaction processing application, a payment allocation module, and a digital wallet account stored thereon, the digital wallet account associated with a cardholder and having a pro-rata digital wallet associated therewith, the pro-rata digital wallet comprising two or more payment card accounts associated with the cardholder; and
   a processor in communication with said datastore, said processor programmed to:
   receive, via the transaction processing application, an authorization request message from a point-of-sale (POS) terminal, the authorization request message including an identification number received by the POS terminal from a transaction device presented by the cardholder;
   determine that the identification number corresponds to one of the two or more payment card accounts associated with the pro-rata digital wallet;
   identify each of the two or more payment card accounts associated with the pro-rata digital wallet;
   for each of the two or more payment card accounts, multiply an interest rate of a respective payment card account by an available balance of the respective payment card account using the payment allocation module to obtain a resulting value;
   using the payment allocation module, sum the resulting values of the two or more payment card accounts to obtain a total result;
   divide the total result by a total available balance of the two or more payment card accounts using the payment allocation module to obtain a combined mean interest rate;
   determine, using the payment allocation module, a respective adjustment factor for each respective payment card account, the adjustment factor based on the interest rate of the respective payment card account relative to the combined mean interest rate; and
   determine, using the payment allocation module, a pro-rata payment amount for each respective payment card account, each respective pro-rata payment amount based on the available balance of the respective payment card account relative to the total available balance of the two or more payment card accounts and multiplied by the respective adjustment factor of the respective payment card account.

2. The digital wallet service server in accordance with claim 1, said processor further programmed to:
   determine the available balance for each of the two or more payment card accounts; and
   determine the total available balance of the two or more payment card accounts by summing the available balances of the two or more payment card accounts.

3. The digital wallet service server in accordance with claim 2,
   said processor being further programmed, as part of the operation of determining the pro-rata payment amount for each of the payment card accounts, to determine an available balance percentage for each of the payment card accounts by dividing the available balance for each of the payment card accounts by the total available balance.

4. The digital wallet service server in accordance with claim 3,
   the authorization request message including a transaction amount,
   said processor being further programmed, as part of the operation of determining the pro-rata payment amount for each of the payment card accounts, to multiply the available balance percentage for each of the payment card accounts by the transaction amount.

5. The digital wallet service server in accordance with claim 1,
   said processor being further programmed to generate a pro-rata authorization request message for each of the payment card accounts associated with the pro-rata digital wallet.

6. The digital wallet service server in accordance with claim 5, said processor being further programmed to transmit each of the pro-rata authorization request messages to its respective payment network based on a bank identification number contained in the respective payment card accounts.

7. The digital wallet service server in accordance with claim 6,
said processor being further programmed to:
receive one or more pro-rata authorization request response messages from each respective payment network, each pro-rata authorization request response messages associated with a respective pro-rata authorization request message; and
determine whether each of the pro-rata authorization request response messages authorizes its respective authorization request.

8. The digital wallet service server in accordance with claim 7, wherein if each of the pro-rata authorization request response messages authorizes its respective pro-rata authorization request message,
said processor being further programmed to transmit an authorization request response message to the POS terminal.

9. The digital wallet service server in accordance with claim 7, wherein if at least one of the pro-rata authorization request response messages does not authorize its respective pro-rata authorization request message,
said processor being further programmed to determine, using the payment allocation module, a second pro-rata payment amount for each of the payment card accounts associated with the pro-rata authorization request response messages that contain an authorization in response to it respective pro-rata authorization request message.

10. A method comprising:
receiving, by a digital wallet service server via a transaction processing application, an authorization request message from a point-of-sale (POS) terminal, the authorization request message including an identification number received by the POS terminal from a transaction device presented by a cardholder;
determining, by the digital wallet service server, that the identification number corresponds to a payment card account associated with a pro-rata digital wallet, the pro-rata digital wallet including two or more payment card accounts associated with the cardholder;
identifying, by the digital wallet service server, each of the two or more payment card accounts associated with the pro-rata digital wallet;
for each of the two or more payment card accounts, multiplying an interest rate of a respective payment card account by an available balance of the respective payment card account using a payment allocation module of the digital wallet service server to obtain a resulting value;
using the payment allocation module, summing the resulting values of the two or more payment card accounts to obtain a total result;
dividing the total result by a total available balance of the two or more payment card accounts using the payment allocation module to obtain a combined mean interest rate;
determining, using the payment allocation module, a respective adjustment factor for each respective payment card account, the adjustment factor based on the interest rate of the respective payment card account relative to the combined mean interest rate; and
determining, using the payment allocation module, a pro-rata payment amount for each respective payment card account, each respective pro-rata payment amount based on the available balance of the respective payment card account relative to the total available balance of the two or more payment card and multiplied by the respective adjustment factor of the respective payment card account.

11. The method in accordance with claim 10,
said method further comprising:
determining the available balance for each of the two or more payment card accounts; and
determining the total available balance of the two or more payment card accounts by summing the available balances of the two or more payment card accounts.

12. The method in accordance with claim 11,
said method further comprising, as part of the operation of determining the pro-rata payment amount for each of the payment card accounts, determining an available balance percentage for each of the payment card accounts by dividing the available balance for each of the payment card accounts by the total available balance.

13. The method in accordance with claim 12, wherein the authorization request message includes a transaction amount,
said method further comprising, as part of the operation of determining the pro-rata payment amount for each of the payment card accounts, multiplying the available balance percentage for each of the payment card accounts by the transaction amount.

14. The method in accordance with claim 10,
said method further comprising generating a pro-rata authorization request message for each of the payment card accounts associated with the pro-rata digital wallet.

15. The method in accordance with claim 14,
said method further comprising transmitting each of the pro-rata authorization request messages to its respective payment network based on a bank identification number contained in the respective payment card accounts.

16. The method in accordance with claim 15,
said method further comprising:
receiving one or more pro-rata authorization request response messages from each respective payment network, each pro-rata authorization request response messages associated with a respective pro-rata authorization request message; and
determining whether each of the pro-rata authorization request response messages authorizes its respective authorization request.

17. The method in accordance with claim 16, wherein if each of the pro-rata authorization request response messages authorizes its respective pro-rata authorization request message,
said method further comprising transmitting an authorization request response message to the POS terminal.

18. The method in accordance with claim 16, wherein if at least one of the pro-rata authorization request response messages does not authorize its respective pro-rata authorization request message,
said method further comprising determining, using the payment allocation module, a second pro-rata payment amount for each of the payment card accounts associated with the pro-rata authorization request response messages that contain an authorization in response to it respective pro-rata authorization request message.

\* \* \* \* \*